Patented Jan. 7, 1930

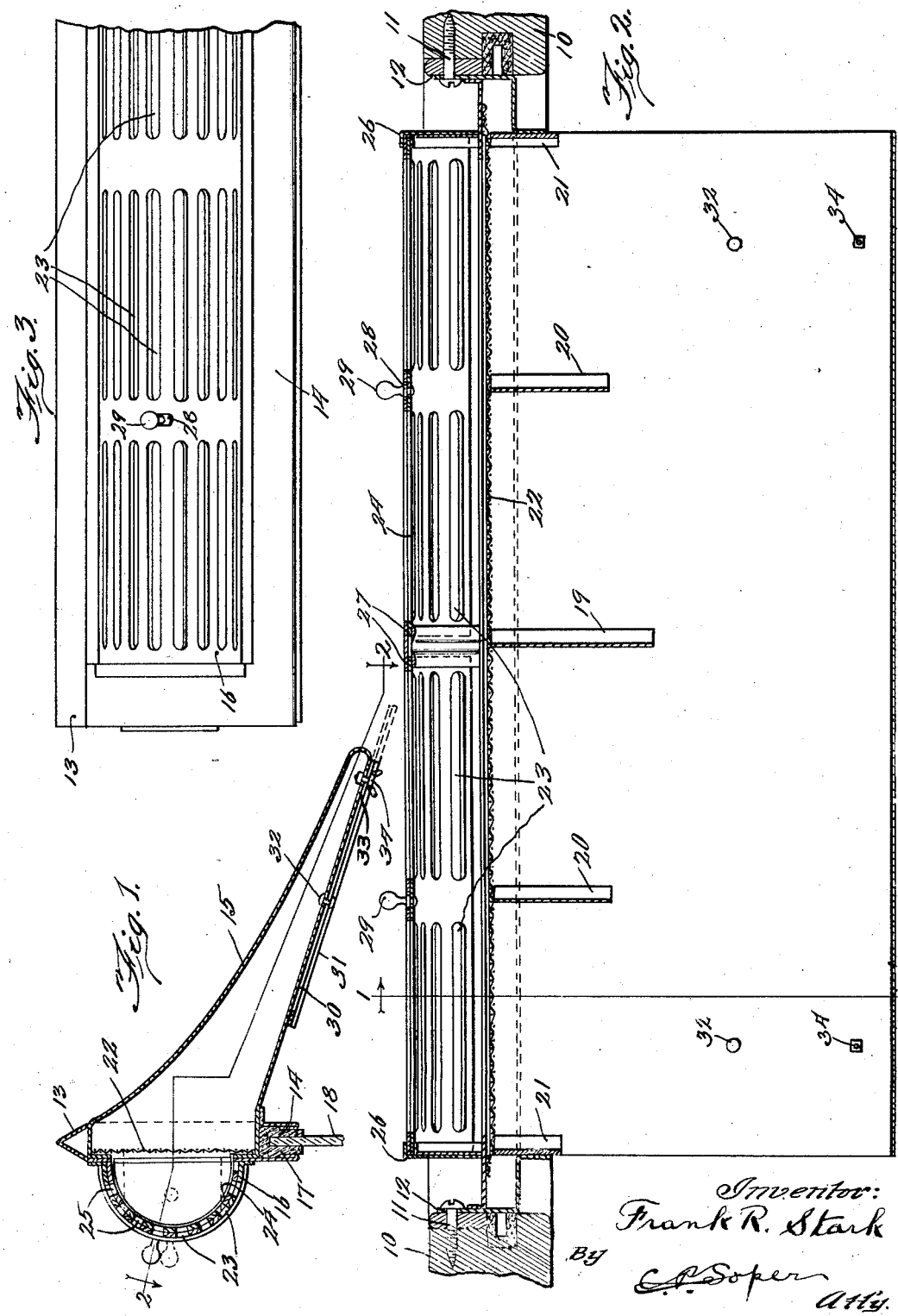
Jan. 7, 1930.  F. R. STARK  1,742,290
VENTILATOR
Filed July 10, 1928

1,742,290

UNITED STATES PATENT OFFICE

FRANK R. STARK, OF CHICAGO, ILLINOIS

VENTILATOR

Application filed July 10, 1928. Serial No. 291,508.

This invention relates to ventilators of the character employed to change the air within a closed vehicle, such as an automobile or railway car, and is a modification and improvement on the structure disclosed in applicant's Patent No. 1,605,080, Nov. 2, 1926.

The object of the invention is to provide an improved ventilator, and one in which the ventilator structure will act as a shade, awning or visor for the window to which it is applied.

One of the features of the invention resides in forming the external tubular member as an elongated triangle in cross section, the remote edge of said tubular member being positioned a substantial distance beyond the window. If desired, the tubular member may be arranged with a downward slant so as to form a more perfect visor.

Another feature of the invention is the provision of an adjustable or extensible strip along one side of the tubular member, whereby the visor may be adjusted to extend a greater distance from the window.

A still further feature of the invention is the provision at each end of the tubular member, of a wall or plate to prevent rain or other foreign substances entering the car through the ventilator.

Other features and advantages will appear from time to time as the description of the invention progresses.

It is believed the further disclosure of the invention will be understood most readily from a detailed description thereof taken in connection with the accompanying drawings in which, Fig. 1 is a transverse section through the ventilator on the line 1—1 of Fig. 2, and shows how the tubular member extends outwardly and downwardly to form a visor or shade for the window. The extensible visor plate also appears in this view;

Fig. 2 is a longitudinal section substantially on the line 2—2 of Fig. 1, and shows the rain deflecting plates at the ends of the tubular member; and Fig. 3 is a view showing the ventilator as it appears from the inside of the vehicle when applied to the window thereof.

Referring now to the drawings, in which like reference characters indicate the same parts in the several views, 10 indicates the side stiles of the window opening, in which the ventilator is secured by means of the screws 11, which pass through the flanges 12, at the ends of the ventilator and into the stiles 10.

Secured between the end flanges 12 in any desired manner are the upper triangular frame member 13 and the lower frame member 14, which is inverted U-shaped in cross-section, as shown in Fig. 1.

An elongated V-shaped member 15 has one of its edges secured to the frame member 13 and its other edge to member 14. The member 15 is the portion of the ventilator which projects beyond the window and forms the visor or shade. The part 15 also contains the baffles which cause the air to be forced into the vehicle at one end of the ventilator and exhausted from the other, as will be explained presently. Secured to frame members 13 and 14 at the sides opposite to the member 15 are the edges, respectively, of the curved, substantially semi-cylindrical member 16. The parts above referred to will be constructed of a fairly rigid sheet material and form the supporting frame work of the ventilator. While ventilators constructed by applicant have been made of sheet metal, it is understood that other materials may be employed with satisfactory results.

In applying the ventilator to the window of a vehicle, as an automobile, the upper edge of the triangular member 13 will be inserted in the upper glass channel of the window and the flanges 12 then secured to the stiles 10, as above explained.

The channel 14 will preferably be provided with an inverted U-shaped piece 17 of felt or other elastic material adapted to receive the upper edge of the glass 18 of the window. It will thus readily be understood that the ventilator is positioned at the top of the window opening, with the curved member 16 within the car and the member 15 projecting outwardly and downwardly over the window.

Secured within the tubular member 15 is a central baffle 19, and the shorter baffles 20, one on each side of baffle 19. The ends of the member 15 are closed adjacent to the plane of the window by the plates or baffles 21. It will be noted that the plates 21 extend outwardly a less distance than baffles 20.

Secured in any desired manner between the frame members 13 and 14, and extending the length of the ventilator is a strip 22 of fine mesh screen to prevent the passage into the car of particles of dirt in the atmosphere.

The curved member 16 is provided with a plurality of series of elongated slots 23, shown on each of the figures of the drawings. Snugly fitting within the curved member 16 are the similar curved damper members 24, having therein slots 25, like the slots 23 in member 16. Two of the damper members 24 are provided, one for each end of the member 16. The ends of the members 24 are received by the channels or grooves 26 and 27, and are arranged for upward and downward movement, as seen in Fig. 1 of the drawings. The member 16 is provided with the slots 28, through which extend the reduced portions of the handles or knobs 29, the inner ends of said handles being fixed to the plates or dampers 24, respectively. The damper 24 is shorter than member 16, by the width of one of the slots 23. Therefore, it readily may be seen that when one of the dampers 24 is in its uppermost position, the slots 23 will be open, and when a damper 24 is in its lowermost position, its solid portions will overlie the slots 23. It is, of course, obvious that the slots 23 may be closed to any degree desired by adjusting the dampers 24.

If desired, the ventilator may be provided with an extensible visor, as shown in Fig. 1. This device comprises a plate or sheet 30 of rigid material adjustably secured to the lower surface of the member 15. The plate 30 may be provided with slots 31, through which extend the lugs 32, the inner ends of which are riveted into the member 15. The plate 31 is also provided with a slot 33, through which extends the set screw 34, the inner end of which is screw threaded into member 15. Set screw 34 may be used to maintain the extensible visor 30 in its adjusted position.

In operation, when the vehicle is in motion, air will be received in the forward end of the member 15. Part of it will encounter the forward baffle 20 and central baffle 19, and will be forced into the vehicle through the screen 22 and slots 23, assuming the corresponding damper is in open position. The balance of the air entering the member 15 will be placed under compression, and in rushing past the central baffle 19, and out the rear end of the member 15, will have an ejector action and create a vacuum in the rear half of the ventilator, causing the air to be exhausted from the vehicle through the slots 23 in the rear half of member 16. The dampers 24 permit the amount of air admitted or exhausted from the vehicle to be controlled as desired. As the air is forcibly admitted at one end of the ventilator and exhausted from the other, the air in the vehicle is put in rapid circulation, and any foul air or smoke is quickly removed. The plates 21, at the ends of the radiator, act to deflect rain, snow and the larger particles of dirt in the atmosphere downwardly into the lower part of member 15, from whence it may readily pass out of the opposite end of member 15.

The device above described has, not only all the advantages of the ventilator disclosed in applicant's patent above referred to, but in addition provides a visor or awning for the window.

While in the drawings and above description but one form of the device has been disclosed, it is to be understood that modifications in the form, relative size and arrangement of the parts are contemplated. The invention, therefore, should be limited only by the scope of the claims.

Having thus described the invention, what I claim is new and desire to secure by Letters Patent of the United States is:

1. In a ventilator for closed vehicles, a frame having an opening therethrough, means for securing said frame within a window opening of the vehicle, an elongated V-shaped member extending outwardly and downwardly from said frame, means securing the edges of said V-shaped member to said frame on opposite sides of said opening, a baffle within said V-shaped member extending outwardly from the plane of the window, said baffle being arranged to leave an opening for the passage of air thereby, and an adjustable closure carried by said frame for controlling the size of the opening therethrough.

2. In a ventilator for closed vehicles, a frame having an opening therethrough, means for securing said frame within a window opening of the vehicle, an elongated V-shaped member extending outwardly and downwardly a substantial distance from said frame, means securing the edges of said V-shaped member to said frame on opposite sides of said opening, a baffle within said V-shaped member extending outwardly from the plane of the window, said baffle being arranged to leave an opening for the passage of air thereby, and an adjustable closure carried by said frame for controlling the size of the opening therethrough.

3. In a ventilator for closed vehicles, a frame having an opening therethrough, means for securing said frame within a window opening of the vehicle, an elongated V-shaped member extending outwardly from said frame, means securing the edges of said V-shaped member to said frame on opposite sides of said opening, a baffle within said V-shaped member extending outwardly from the plane of the window, said baffle being arranged to leave an opening for the passage of air thereby, an adjustable closure carried by said frame for controlling the size of the opening therethrough, and plates, one at each end of said V-shaped member for closing the end thereof adjacent to the plane of the window, the said plates being arranged to extend outwardly a distance less than the said baffle.

4. In a ventilator for closed vehicles, a frame having an opening therethrough, means for securing said frame within a window opening of the vehicle, an elongated V-shaped member extending outwardly from said frame, means securing the edges of said V-shaped member to said frame on opposite sides of said opening, a plurality of baffles within said V-shaped member extending outwardly from the plane of the window, said baffles being arranged to leave an opening for the passage of air therethrough, an adjustable closure carried by said frame for controlling the size of the opening therethrough, and plates, one at each end of said V-shaped member, for closing the end thereof adjacent to the plane of the window, the said plates being arranged to extend outwardly a distance less than the said baffles.

5. In a ventilator for closed vehicles, a frame having an opening therethrough, means for securing said frame within a window opening of the vehicle, an elongated V-shaped member extending outwardly from said frame, means securing the edges of said V-shaped member to said frame on opposite sides of said opening, a baffle within said V-shaped member extending outwardly from the plane of the window, said baffle being arranged to leave an opening for the passage of air thereby, an adjustable closure carried by said frame for controlling the size of the opening therethrough, a plate, and means for adjustably securing the said plate to said V-shaped member to permit the extension thereof outwardly beyond the said V-shaped member.

6. In a ventilator for closed vehicles, a frame having an opening therethrough, means for securing said frame within a window opening of the vehicle, an elongated V-shaped member extending outwardly and downwardly from said frame, means securing the edges of said V-shaped member to said frame on opposite sides of said opening, a plurality of baffles within said V-shaped member extending outwardly from the plane of the window, said baffles being arranged to leave an opening for the passage of air thereby, an adjustable closure carried by said frame for controlling the size of the opening therethrough, a plate, and means for adjustably securing the said plate to said V-shaped member to permit the extension thereof outwardly beyond the said V-shaped member.

In testimony whereof I have signed this specification.

FRANK R. STARK.